United States Patent

[11] 3,573,555

| [72] | Inventor | James W. Lipnitz |
| | | Cherry Hill, N.J. |
| [21] | Appl. No. | 797,966 |
| [22] | Filed | Feb. 10, 1969 |
| [45] | Patented | Apr. 6, 1971 |
| [73] | Assignee | I-T-E Imperial Corporation |
| | | Philadelphia, Pa. |

[54] TIME DELAY EXTENDER FOR STATIC RELAYS
6 Claims, 5 Drawing Figs.

[52] U.S. Cl. .................................................... 317/33,
317/36, 317/142
[51] Int. Cl. ....................................................... H01h 47/18
[50] Field of Search ............................................ 317/33, 36
(TD), 142, 148.5 (TD)(Inquired)

[56] References Cited
UNITED STATES PATENTS

| 3,319,127 | 5/1967 | Zocholl et al. ................. | 317/36 |
| 3,327,171 | 6/1967 | Lipnitz et al. ................. | 317/36 |
| 3,419,757 | 12/1968 | Steen ............................ | 317/36 |

Primary Examiner—James D. Trammell
Attorney—Ostrolenk, Faber, Gerb and Soffen

ABSTRACT: A static relay using a resistance-capacitance network has a current-time characteristic which has an inverse relationship. The input to the network is connected through a free-running multivibrator which has an adjustable conduction period. Adjustment of the conduction period adjusts the time delay characteristic of the network over a large range without altering the time delay wave shape.

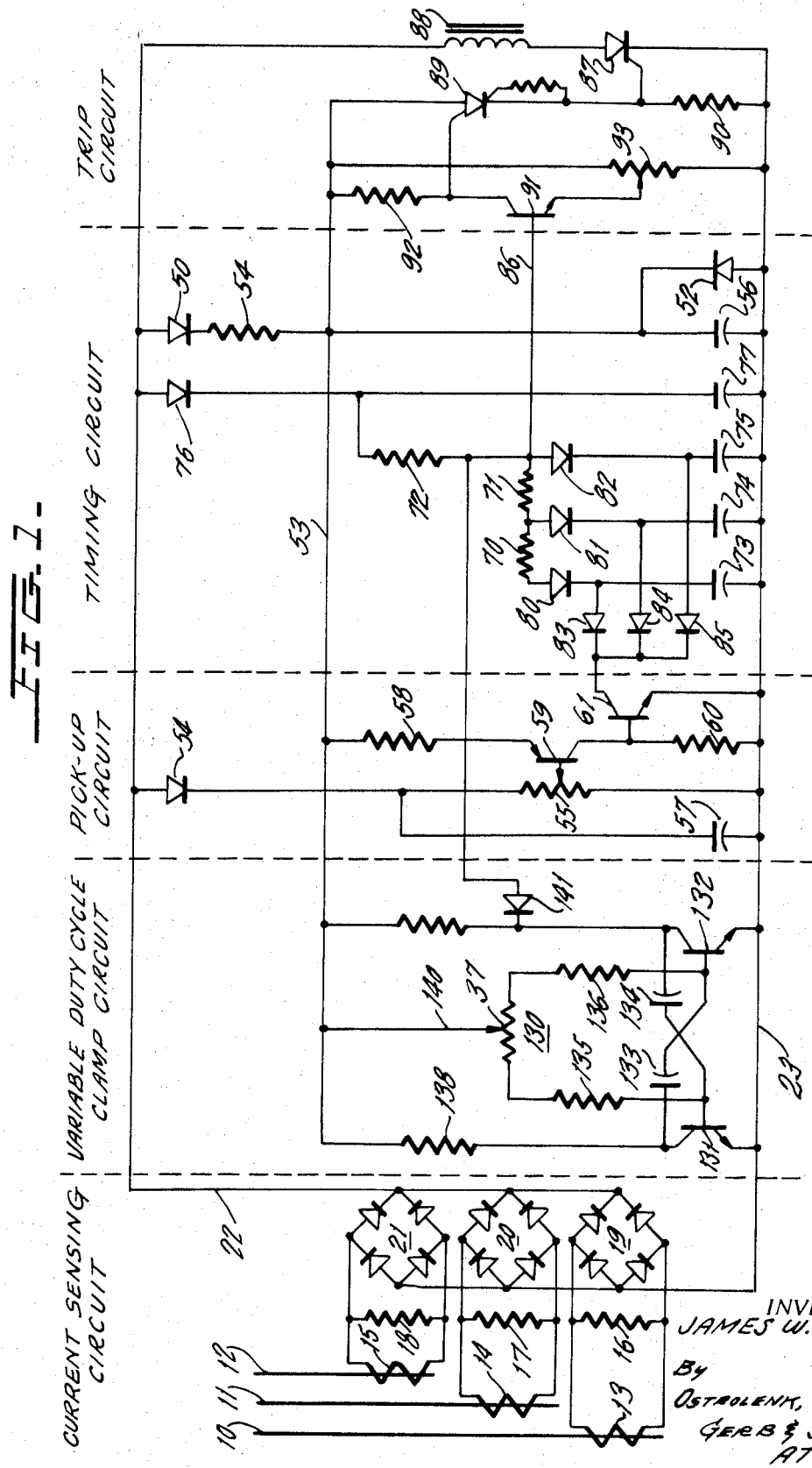

Patented April 6, 1971

INVENTOR.
JAMES W. LIPNITZ
BY
OSTROLENK, FABER, GERB & SOFFEN
ATTORNEYS

TIME DELAY EXTENDER FOR STATIC RELAYS

This invention is an improvement of the static relays shown in U.S. Pat. No. 3,319,127 to Zocholl et al. and in U.S. Pat. No. 3,327,171 to Lipnitz et al. each of which are assigned to the assignee of the present invention.

This invention relates to static relay devices, and more particularly relates to a novel time delay adjustment circuit for adjusting the charging time of a resistance capacitance network without altering the basic shape of its charging curve.

The above-noted patents describe a static relay device which has an inverse time-current characteristic and which replaces electromechanical relays which were previously used to obtain this characteristic. Essentially, the static relay device of the above patents consists of a suitable pickup circuit which is connected to a circuit being monitored; a timing circuit which is charged from the pickup circuit (when the circuit being monitored has an output which exceeds a given threshold value) according to a predetermined inverse current-time characteristic; and a tripping circuit which is operated when the timing circuit output exceeds a particular value.

In the past, the time delay range of such relays has been extended by increasing the size of the capacitors in the time delay network. This leads to relatively large components, and can cause a significant increase in the cost of the relay. Moreover, it is very difficult to produce wide ranges of time delay adjustment without altering the basic wave shape of the timing network when using a simple resistance-capacitance network. Thus, as shown in U.S. Pat. No. 3,327,171, to obtain discrete adjustment of time delay, it is necessary to simultaneously adjust all capacitors and resistors of the network.

In accordance with the present invention, a variable duty cycle clamp is connected in front of the timing network, thereby permitting continuous control of the time constant of the timing network without altering the R-C time constant of the circuit. This time constant can be increased or controlled without altering the basic wave shape of the circuit characteristic by varying the conduction time of the clamping circuit.

Accordingly, a primary object of this invention is to provide a novel circuit for extending the time delay range of a static relay.

Another object of this invention is to increase the total available time delay of a static relay without increasing the size of capacitors in the timing network.

A further object of this invention is to provide a novel circuit for adjusting the time delay characteristic of a static relay without modifying the basic wave shape of the characteristic.

These and other objects of this invention will become apparent from the following description taken in connection with the drawings in which:

FIG. 1 is a circuit diagram of a solid state relay incorporating the present invention;

Figure 2A:
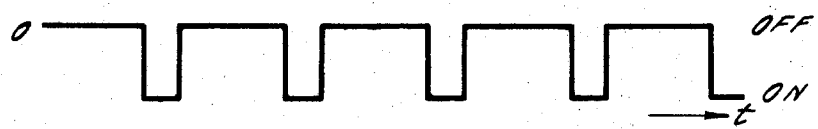
FIGS. 2a, 2b and 2c show the output wave shape of the variable duty cycle clamp circuit of the invention for different adjustment values.

Referring first to FIG. 1, the circuit of the invention is applied to the type circuit shown in U.S. Pat. No. 3,327,171. Thus, the circuit being monitored may be a three-phase circuit having three-phase conductors 10, 11 and 12, each of which contain current transformers 13, 14 and 15, respectively. Burden resistors 16, 17 and 18 are connected across the secondary windings of transformers 13, 14 and 15, respectively, and are connected to respective and parallel connected single-phase full wave rectifiers 19, 20 and 21, respectively. The positive terminals of rectifiers 19, 20 and 21 are connected to bus 22, while the negative terminals of rectifiers 19, 20 and 21 are connected to bus 23. It will be clear that the highest voltage developed by any of the rectifiers 19, 20 and 21 will be the voltage across buses 22 and 23. Thus, fault current in any one of conductors 10, 11 or 12 will produce a distinctive DC voltage on buses 22 and 23.

The specific pickup circuit described above is only typical of any type of pickup that could be used for the monitoring of a circuit which cooperates with the circuit of the present invention. Obviously, any desired type of current sensing circuit could be used in connection with the present invention.

The pickup circuit of FIG. 1 is similar to the pickup circuit of the aforementioned patents. Thus, the voltage of buses 22 and 23 is applied across diode 50, resistor 51 and Zener diode 52 to establish a reference potential between bus 23 and conductor 53. A second circuit consisting of diode 54 and potentiometer 55 are also connected between bus 22 and 23. Filter capacitors 56 and 57 are connected across Zener diode 52 and potentiometer 55, respectively. The constant voltage between conductor 53 and bus 23 is connected to the series circuit formed of resistor 58, the emitter-collector circuit of transistor 59 and resistor 60. The base of transistor 59 is connected to the wiper of potentiometer 55 and the collector of transistor 59 is connected to the base of transistor 61.

The operation of the pickup circuit is such that, if the voltage output of the current-sensing circuit is below a given magnitude, the bias on the base of transistor 59 places transistor 59 in a conductive condition. This, in turn, causes transistor 61 to conduct. As will be seen later, conduction of transistor 61 suppresses the operation of the timing circuit. However, when the voltage between buses 22 and 23 is higher than a predetermined value, transistor 59 turns off and transistor 61 is consequently cut off so that the timing sequence begins.

The timing circuit may be identical to the circuit shown in the aforementioned patents and consists of resistors 70, 71 and 72 and the respective capacitors 73, 74 and 75. Each of capacitors 73, 74 and 75 have one terminal connected to bus 23, and they are connected with their resistors to positive bus 22 through diode 76. A capacitor 77 is connected in series with diode 76 and buses 22 and 23 to serve as a peak detecting filter. The timing circuit of FIG. 1 is modified from that of the aforementioned patents by the use of series diodes 80, 81 and 82 which prevent discharge of accumulated charge from capacitors 73, 74 and 75, respectively. Moreover, each of capacitors 73, 74 and 75 are connected to the collector of transistor 61 through diodes 83, 84 and 85, respectively. The output of the timing circuit is then taken from a lead 86 extending from the junction between diode 82 and resistor 72 to control a trip circuit.

The trip circuit may take any desired form which becomes operative when the potential at lead 86 reaches a value determined by the wiper of potentiometer 93. The trip circuit illustrated consists of a controlled rectifier 87 which is connected in series with a suitable relay or tripping coil 88 and buses 22 and 23. Controlled rectifier 87 is fired responsive to firing of silicon controlled switch 89 which is connected in series with conductor 53, resistor 90 and bus 23. The top of resistor 90 is then connected to the gate of controlled rectifier 87.

Silicon controlled switch 89 is fired responsive to the conduction of transistor 91, the base of which is connected to lead 86. Thus, the emitter-collector circuit of transistor 91 is connected in series with lead 53, resistor 92, the lower portion of potentiometer 93 and bus 23. Potentiometer 93 is so adjusted that the transistor 91 becomes conductive when the potential of lead 86 assumes a predetermined voltage (through the charging of the timing network) with respect to bus 23. The gate of silicon controlled switch 89 is connected to the collector of transistor 91 so that silicon controlled switch 89 (and thus controlled rectifier 87) is fired when transistor 91 conducts, thereby to energize coil 88.

In accordance with the present invention, and as contrasted to the circuit of U.S. Pat. No. 3,327,171, a variable duty cycle clamp circuit is connected in parallel with the current-sensing circuit and consists of a free running multivibrator circuit 130. Thus, transistors 131 and 132 are connected as shown with capacitors 133 and 134, resistors 135 and 136, and potentiometer 137. The emitters of transistors 131 and 132 are connected to negative bus 23. The collectors of transistors 131 and 132 are connected through resistors 138 and 130, respectively, to the wiper arm lead 140 of potentiometer 137, through resistor 51 and diode 50 to the positive bus 22.

Figure 2B:
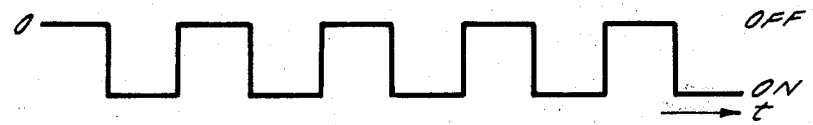
Figure 2C:
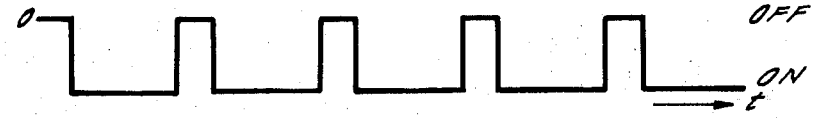

In operation, the collector voltage of transistor 132 will be either full voltage, or substantially zero voltage, depending on whether transistor 132 is in a conducting or nonconducting state. FIGS. 2a, 2b and 2c show the collector voltage of transistor 132 for different adjustment positions of potentiometer 137. Thus, when wiper 140 is 25 percent to the left in FIG. 1, the pulse length or conduction time of transistor 132 is shown in FIG. 2a. When the wiper arm 140 is in the center and 75 percent to the left in FIG. 1, respectively, the conduction time of transistor 132 is shown in FIGS. 2b and 2c, respectively. The range of conduction time of transistor 132 is quite large and could be from 1 percent of the multivibrator cycle to the full cycle.

The circuit described above is connected in parallel with the timing circuit, and, as will be seen hereinafter, affects the charging of the capacitors in the timing circuit such that a larger time delay is available without increasing capacitor size.

The clamping circuit and particularly, the collector of transistor 132, is then connected to the timing network by means of diode 141 which is connected to the bottom of resistor 72.

It should be noted that all of the foregoing circuitry of FIG. 1 derives all biasing potentials and operating potentials from the buses 22 and 23, and that there is no reliance on auxiliary voltage sources.

The operation of the novel circuit is as follows:

If a fault current appears in any of conductors 10, 11 or 12, a voltage greater than some given voltage appears between buses 22 and 23. This increased voltage causes transistor 59 to turn off which, in turn, causes transistor 61 to turn off. With the turn-off of transistor 61, the capacitors 73, 74 and 75 of the timing network will now be charged through the circuit including bus 22, diode 76, resistors 72, 71 and 70, diodes 80, 81 and 82 and bus 23 at a rate determined by the values of resistors 70, 71 and 72; the values of capacitors 73, 74 and 75, and the instantaneous value of the voltage between buses 22 and 23.

The timing characteristic of the timing network is such that the voltage $V_0$ at lead 86 will be, $$\frac{V_0}{V_{in}} = \left(\frac{t}{T}\right)^{1/2}$$

where $V_{in}$ is the voltage between buses 22 and 23,
$t$ is elapsed time and, $$T = \frac{T_1}{V_0}$$

where $T_1$ is the time constant of the network formed by resistors 70, 71 and 72 and capacitors 73, 74 and 75.

Figure 3:
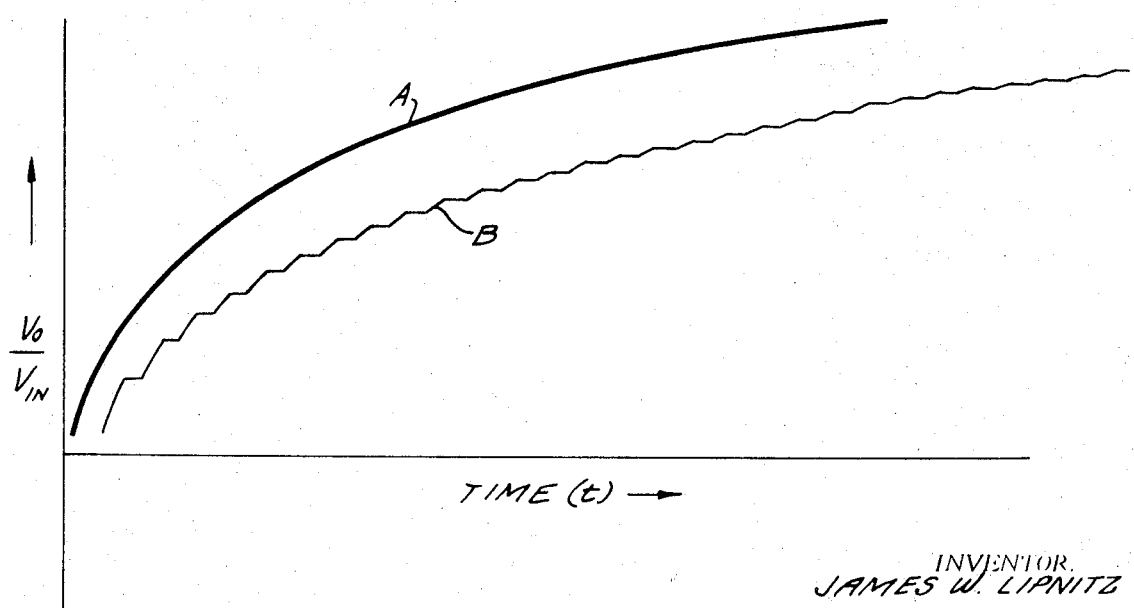
FIG. 3 illustrates the time delay characteristics obtained with the present invention.

The characteristic curve is shown as curve A of FIG. 3.

The clamping circuit of the present invention increases the time constant of the timing network without changing the time constant of the circuit. Thus, the range of adjustment of the relay of the invention can be increased without increasing the size of the capacitors. Moreover, the shape of the curve remains unaffected. Thus, while the transistor 132 conducts, network charging current is bypassed from capacitors 73, 74 and 75 through transistor 132 This delays the charging of the capacitors to produce a characteristic curve of the type shown as curve B of FIG. 3 which has a substantially larger time constant than that of curve A while the same curve shape is retained. As the conduction period of transistor 132 is increased, it will be apparent that the time constant of the charging curve will increase. Thus, the slope of the curve can be easily charged by adjusting potentiometer 37, and thus the conduction time of transistor 132.

Although this invention has been described with respect to particular embodiments, it should be understood that many variations ad modifications will now be obvious to those skilled in the art such as the variation of several independent timing circuits with one control, and, therefore, the scope of this invention is limited not by the specific disclosure herein, but only by the appended claims.

I claim:

1. A static relay comprising:
   a. a current-sensing circuit;
   b. a charging network connected to said current-sensing circuit said charging network having input terminals connected to said current-sensing circuit, and output terminals; the voltage at said output terminals increasing with time according to a predetermined curve after said current-sensing circuit is connected to said input terminals of said charging network;
   c. pickup circuit means connected between said current-sensing circuit and said input terminals of said charging network; said pickup circuit means energizing said input terminals of said charging network when the output of said current-sensing means exceeds a predetermined value;
   d. output circuit means connected to said output terminals of said charging network and being energized when the output of said output terminals exceeds a predetermined value;
   e. and continuously operating switching circuit means operating between a first impedance condition and a second impedance condition at a given operating frequency with said first and second impedance conditions lasting for respective given lengths of time independently of the output of said current-sensing circuit; said continuously operating switching means connected to said input terminals of said charging network and preventing the charging of said charging network from said current-sensing circuit when said switching means is in its said first impedance condition, thereby to increase the effective time constant of said charging network.

2. The relay of claim 1 wherein said charging network consists of a resistor-capacitor network.

3. The relay of claim 1 wherein said switching circuit means comprises a free running multivibrator.

4. The relay of claim 2 wherein said switching circuit means is connected in parallel with the capacitors of said resistor-capacitor network.

5. For use in protecting current distribution networks, static overcurrent relay means responsive to overcurrent conditions for operating circuit protective devices after a predetermined time period and before the network is damaged comprising first means for generating a DC voltage representative of the current being monitored in said network; second means coupled to said first means for generating a predetermined voltage level after a predetermined time delay; third means coupled to said first means and normally inhibiting the operation of said second means until the output voltage level of said first means achieves a predetermined magnitude; constant voltage reference means coupled to the output of said first means for establishing a second predetermined threshold level; fourth voltage-sensitive switch means coupled to said second means and said constant voltage reference means for energizing a circuit protective device when the output voltage of said second means achieves said second predetermined threshold level; and continuously operating switching circuit means operating between a high impedance condition and a low impedance condition at a given operating frequency with said high and low impedance conditions lasting for respective given lengths of time independently of the output of said first means; said continuously operating switching means connected to said second means and permitting the energization of said second means only when said switching means is in its said high impedance condition, thereby to increase the effective time constant of said second means.

6. For use in protecting current distribution networks, static overcurrent relay means responsive to overcurrent conditions for operating circuit protective devices after a predetermined time period and before the network is damaged, comprising:
   first means for generating a DC voltage representative of the current being monitored in said network;

second means coupled to said first means for generating a predetermined voltage level after a predetermined time delay;

third means coupled to said first means and normally inhibiting the operation of said second means until the output voltage level of said first means achieves a predetermined magnitude;

fourth means coupled to said second means for energizing a circuit protective device when the output voltage of said second means achieves a second predetermined magnitude;

said first means being comprised of current transformer means, and full wave rectification means connected across the output of said current transformer means for generating said DC voltage;

said second means being comprised of a passive network of resistive and reactive elements for generating the desired time delay substantially in accordance with the equation $$\frac{V_0}{V_1} = \left(\frac{t}{T}\right)^{1/2}$$

where:
$V_0$ is the output voltage of said timing circuit;
$V_1$ is the input voltage to said timing circuit;
$t$ is elapsed time; and $$T = \frac{T_1}{V_0}$$

where $T_1 =$ time constant of the timing circuit; and continuously operating switching circuit means operating between a first impedance condition and a second impedance condition at a given operating frequency with said first and second impedance conditions lasting for respective given lengths of time independently of the output of said first means; said continuously operating switching means connected to said second means and permitting the energization of said second means only when said switching means is in its said high impedance condition, thereby to increase the effective time constant of said second means.